United States Patent [19]

Groves

[11] Patent Number: 4,661,937
[45] Date of Patent: Apr. 28, 1987

[54] SONAR BEAM STEERING CIRCUIT

[75] Inventor: Kenneth W. Groves, Forest Hills, N.Y.

[73] Assignee: Sperry Corporation, New York, N.Y.

[21] Appl. No.: 718,407

[22] Filed: Apr. 1, 1985

[51] Int. Cl.$^4$ ............................................. G01S 3/80
[52] U.S. Cl. .................................. 367/103; 367/100; 367/123
[58] Field of Search ................................. 367/99–101, 367/103, 123, 119, 121

[56] References Cited

U.S. PATENT DOCUMENTS 3,419,845  12/1968  Thiede et al. ...................... 367/103
4,423,494  12/1983  Groves et al. ..................... 367/103

Primary Examiner—Thomas H. Tarcza
Assistant Examiner—Daniel T. Pihulic
Attorney, Agent, or Firm—Howard P. Terry

[57] ABSTRACT

A multibeam acoustic apparatus utilizing a linear array of hydrophone elements in a sonar system includes a cascaded ladder capacitance-inductance network for coupling electrical signals to and from the individual hydrophone elements. The hydrophone elements are connected in series and the natural capacitance of these elements provides the capacitive characteristics of the network. Shunt inductors supply the inductance characteristics and provide a phase characteristic inversely related to frequency. Variable cumulative phase delays are provided for signals applied to successive hydrophone elements whereby a sonar beam is formed in a direction determined by the frequency of the exciting signal.

2 Claims, 4 Drawing Figures

SONAR BEAM STEERING CIRCUIT

BACKGROUND OF THE INVENTION

1. Field of the Invention

The present invention relates to sonar systems and more particularly to electronic means for steering sonar beams in such systems.

2. Description of the Prior Art

Ship-mounted sonar systems sometimes provide acoustic beams essentially only in a horizontal plane. Such systems are satisfactory for acoustic energy received along a direct path or from a convergence zone. However such systems are not satisfactory for situations where it is desired to receive energy reflected from the ocean bottom. Sonar systems capable of responding to such "bottom bounce" have been developed wherein provisions are made for depressing the acoustic beams. However such systems are more complicated than those intended only for horizontal transmission and reception.

Typically, marine sonar systems employ a hydrophone array in which the individual elements in the array are combined with proper delays in order to form an acoustic beam. A square array might be used, for example, where inter-element delays can be provided to steer the beam in a horizontal or vertical plane. If a beam is to be formed in one plane only (e.g., in the horizontal plane), the elements in the opposite (vertical) plane are combined without inter-element delays, preserving only the ability to steer the beam in the first (horizontal) plane by introducing delays between elements in that plane.

In some prior art systems, capability of steering the beam in either plane is achieved by complex means for controlling the delays asociated with each element. Such systems permit vertical steering to optimally steer the beam for bottom bounce as well as direct path and convergence zone operation, but this flexibility is achieved at the expense of considerable complexity in the form of individual cables, hull penetration and front end electronics as well as increased data to be processed by the beamformer.

In summary, prior art simple sonars sacrifice bottom bounce capability, whereas improved sonar systems capable of bottom bounce operation are excessively complex.

The present invention overcomes the aforementioned dual problem by providing bottom bounce capability without substantial sacrifice of direct path or convergence zone capability and without a major increase in complexity.

SUMMARY OF THE INVENTION

Acoustic beams associated with a hydrophone array are formed by coupling the individual elements in the array through a capacitance-inductance network that provides a phase characteristic which is inversely related to frequency, so that broadband energy can be simultaneously received from various desired directions.

DESCRIPTION OF THE PREFERRED EMBODIMENT

Figure 1:
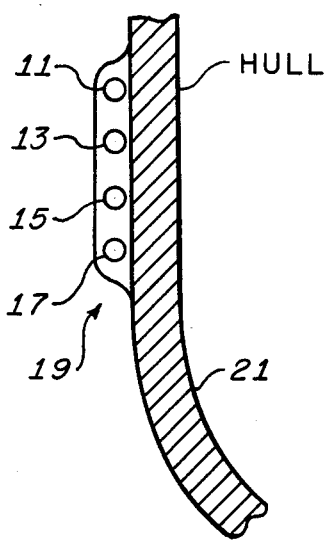
FIG. 1 is a drawing illustrating a typical sonar hydrophone array mounted on the hull of a vessel.

Referring now to FIG. 1, a typical sonar hydrophone array consists of four hydrophone transducer elements 11, 13, 15, and 17 mounted in a casing 19 on the hull 21 of a vessel. As depicted in FIG. 1, the array consists of four elements aligned vertically. However the array may consist of two or any larger number of elements. Furthermore the array may consist of hydrophone elements aligned horizontally, vertically, or in a rectangular pattern, depending on the circumstances of a particular application.

For the purposes of the present explanation, however, a vertical array of four hydrophones will be considered.

Figure 2:
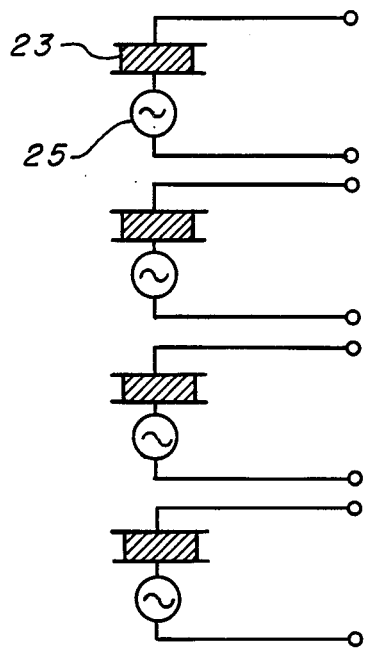
FIG. 2 is a schematic diagram useful in explaining the invention.

The electrical equivalent of the transducer array of FIG. 1 is depicted in FIG. 2 wherein each element effectively consists of a capacitor such as capacitor 23 in series with a signal source 25 representing the transduced acoustic signal.

It will be appreciated that the type of array and electrical concepts depicted in FIG. 1 and 2 are applicable to known devices as well as devices employing the principles of the present invention. In known types of relatively simple sonar systems the individual capacitor-signal source units may simply be connected in series and the two end terminals may be passed through the vessel's hull to the sonar equipment. In more complex prior art devices, the leads from each of the units may be passed through the hull for independent processing so as to permit the beam to be steered to any depression angle.

Figure 3:
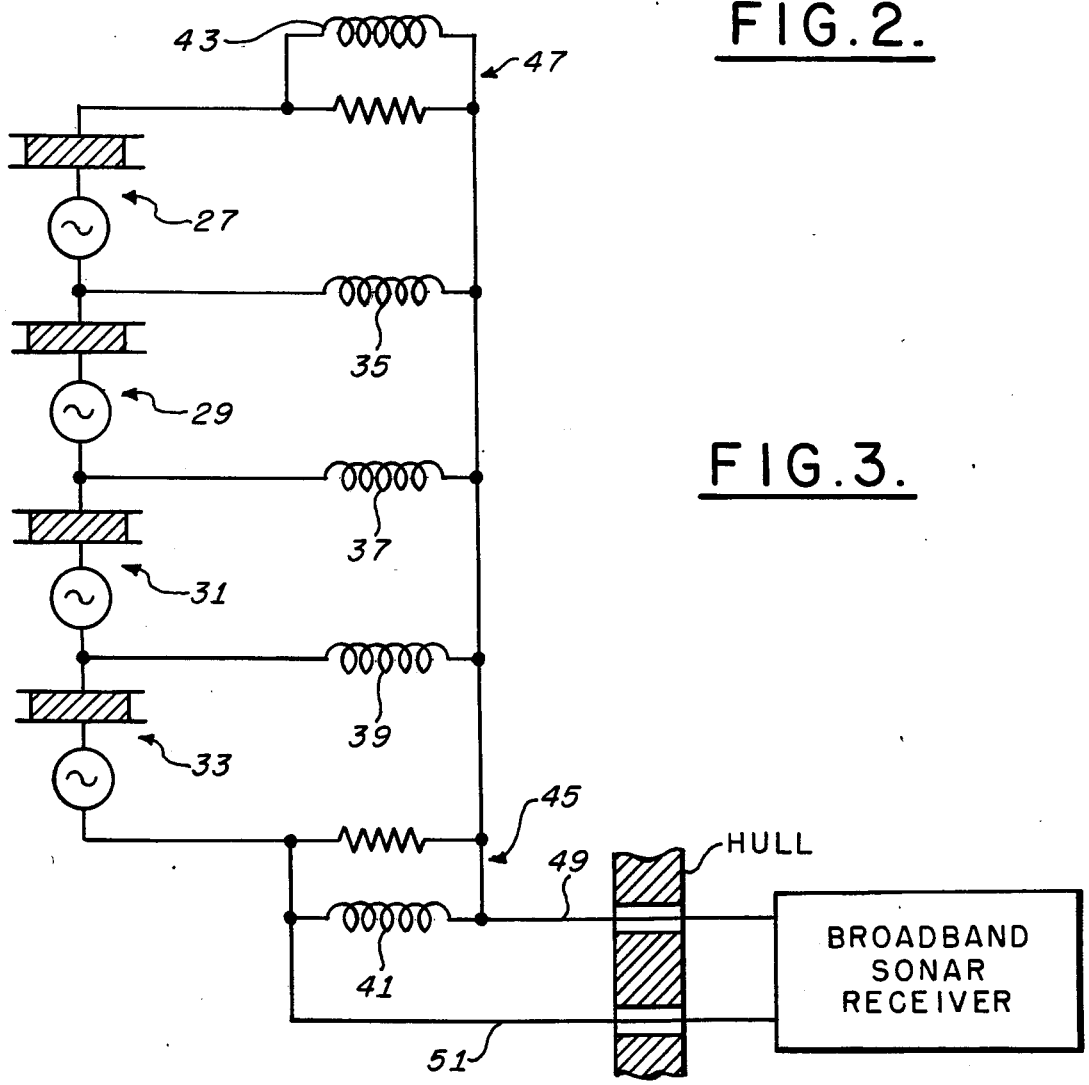
FIG. 3 is a schematic diagram illustrating electrical circuits used in conjunction with the hydrophone array according to the principles of the invention.

The present invention utilizes a novel phasing network in the form of a cascaded ladder configuration as depicted in FIG. 3 wherein four hydrophone elements 27, 29, 31, and 33 are serially connected. The inherent capacitance of each hydrophone element provides the series legs of a CL network whereas the shunt inductors 35, 37, and 39 as well as the inductors 41 and 43 in the resistance-inductance terminating networks 45 and 47 provides the desired inductance.

The hydrophone elements as well as the inductance network may conveniently be enclosed in a casing such as casing 19 of FIG. 1 and coupled to the interior sonar receiver elements of the sonar system by means of through-hull leads 49 and 51 as indicated in FIG. 3.

The network of FIG. 3 is a "lead" network, in contrast to conventional delay lines which exhibit lag characteristics.

To from a depressed beam so as to take advantage of "bottom bounce", the sound reaching the uppermost hydrophone element 27 experiences the greatest water time delay. Therefore it is necessary that the electrical output of that element receive the greatest phase advance. Thus in the circuit of FIG. 3, for example, the uppermost hydrophone element 27 is part of a first stage, and its transduced received signal passes through the remaining stages, meanwhile being summed with the outputs of the remaining stages until the correctly phased sum signal enters the hull.

The phase lead per stage is zero at infinite frequency, because at that frequency the capacitive elements are essentially short circuits whereas the inductive elements are essentially open circuits. Thus no beam steering occurs at very high frequencies and the acoustic beam is essentially horizontal. With decreasing frequency, however, the phase lead increases and the center line of the acoustic beam is progressively depressed.

Figure 4:
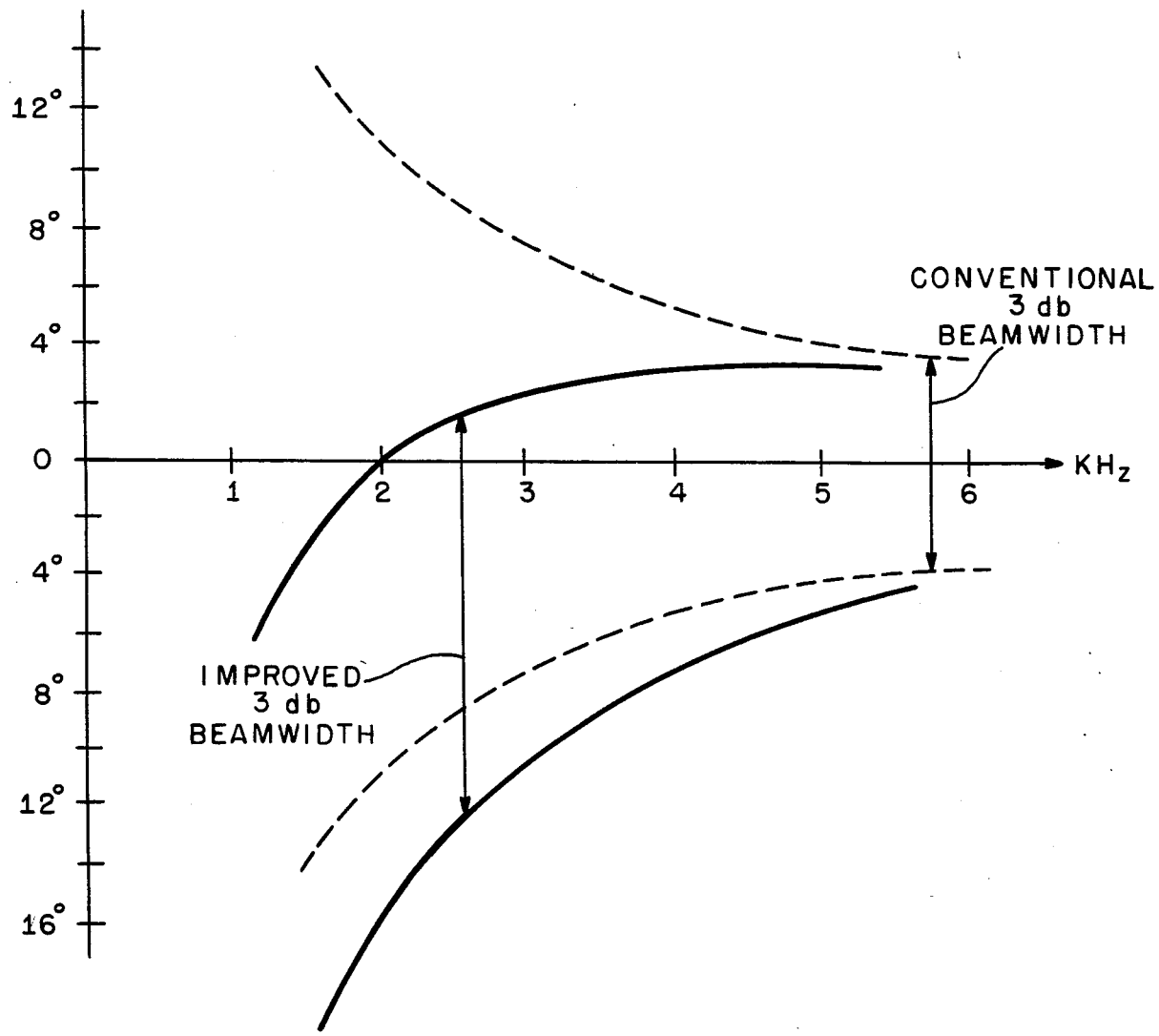
FIG. 4 is a graphical representation illustrating the nature of the acoustic beams at various frequencies.

To better understand the operation of the invention, refer to FIG. 4 which depicts the acoustic beam width as a function of frequency for conventional systems and the same characteristics for the improved system of the invention. Typically the curves represent upper and lower −3dB points of the beams at the indicated frequencies.

It will be seen that a conventional system, a natural broadening of the beam occurs with decreasing frequency. In the conventional systems, the broadening, although inevitable, has been considered undesirable because the broadened beam encompassed more noise. Furthermore, the upper side of the beam faces a region, such as the sea surface directly overhead, with a high noise level and, usually, little useful signal. Meanwhile, the broadening on the lower side, although harmless and potentially useful for bottom bounce operation, is inadequate for realistic bottom bounce performance.

The present invention makes use of the natural beam broadening with decreasing frequency by causing the phase of the signals associated with each hydrophone element to automatically change with frequency so as to steer the beam center with varying frequency so that the broadening is entirely in a desirable direction. As indicated in FIG. 4, for instance, the beam associated with the improved system of the invention shifts downward to a region where there is little noise but a considerable bottom bounce signal.

As indicated in FIG. 4 the system of the invention might provide frequency dependent delays such that a beam depression matches the beam half-width at 2 kHz. The depression varies inversely with the square of the frequency so that the upper and lower −3dB characteristics fall as indicated in FIG. 4.

With these particular characteristics, a useful receiving band one octave wide of 2.5 to 5 kHz provides a coverage in the order of +2 to −6 degrees sufficient for most direct path and convergence zone operations. In addition, the improved system of the invention having the characteristics depicted in FIG. 4 provides another useful band one octave wide in the range of 1.5 to 3 kHz for long range bottom bounce reception with a vertical coverage in the order of −5 to −12 degrees.

Characteristics of the nature of those depicted in FIG. 4 can be obtained by employing a cascaded ladder configuration such as that depicted in FIG. 3 which contains only passive elements consisting of inductors, resistors and the natural transducer capacitance. The CL configuration which is the counterpart of the usual LC configuration, provides a time-shift which is inversely proportional to the square of the frequency.

Each network stage involves negligible loss of energy. The hydrophone's internal impedance provides one of the legs of each stage and the hydrophone's signal enters the network without the need for buffering isolation or amplification. Similarly, the entire network can be cascaded stage by stage without need for buffering, isolation or amplification between stages. These characteristics not only provide economic benefits, but they permit the network to be placed close to or within the hydrophone, external to the hull where maintenance of active devices would be impossible. Thus it becomes feasible to use a line hydrophone containing numerous elements and to cascade these elements through a multiple CL network so that their outputs are properly combined into a single signal to be transmitted by means of a single cable through the ship's hull. This permits broadband energy from multiple vertical directions to be simultaneously received with a system hardly more complex than prior systems having no steering in the vertical plane.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A broadband multi-beam sonar apparatus comprising a multiplicity of hydrophone elements each having an inherent capacitance serially coupled electrically to provide junctions interjacent neighboring hydrophone elements and arranged to establish a hydrophone array, and a plurality of inductive elements arranged such that an inductive element is coupled between each junction and a common buss thereby forming a capacitance-inductance phase lead network providing progressive phase advances between successive serially coupled hydrophone elements that are an inverse function of frequency.

2. The multi-beam apparatus of claim 1 wherein said hydrophone elements in said hydrophone array are aligned vertically and constructed to provide a plurality of beams at depression angles from horizontal position to at least one depression angle capable of receiving bottom bounce signals.

* * * * *